US011573697B2

(12) United States Patent
Kandur Raja et al.

(10) Patent No.: US 11,573,697 B2
(45) Date of Patent: Feb. 7, 2023

(54) METHODS AND SYSTEMS FOR PREDICTING KEYSTROKES USING A UNIFIED NEURAL NETWORK

(71) Applicant: SAMSUNG ELECTRONICS CO., LTD., Suwon-si (KR)

(72) Inventors: Barath Raj Kandur Raja, Bangalore (IN); Ankur Agarwal, Bangalore (IN); Bharath C, Bangalore (IN); Harshavardhana, Bangalore (IN); Ishan Vaid, Bangalore (IN); Kranti Chalamalasetti, Bangalore (IN); Mritunjai Chandra, Bangalore (IN); Vibhav Agarwal, Bangalore (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 6 days.

(21) Appl. No.: 17/111,038

(22) Filed: Dec. 3, 2020

(65) Prior Publication Data
US 2021/0173555 A1 Jun. 10, 2021

(30) Foreign Application Priority Data

Dec. 4, 2019 (IN) .............................. 201941022207
Jun. 4, 2020 (IN) .............................. 201941022207

(51) Int. Cl.
*G06N 3/08* (2006.01)
*G06F 3/04886* (2022.01)
(Continued)

(52) U.S. Cl.
CPC .......... *G06F 3/04886* (2013.01); *G06F 17/18* (2013.01); *G06N 3/04* (2013.01); *G06N 3/08* (2013.01)

(58) Field of Classification Search
None
See application file for complete search history.

(56) References Cited

U.S. PATENT DOCUMENTS 8,832,589 B2    9/2014  Zhai et al.
9,678,664 B2 *  6/2017  Zhai .................... G06F 3/04883
(Continued)

FOREIGN PATENT DOCUMENTS

WO      2019/199942 A1    10/2019

OTHER PUBLICATIONS

International Search Report (PCT/ISA/210) dated Mar. 9, 2021 issued by the International Searching Authority in International Application No. PCT/KR2020/016930.
(Continued)

*Primary Examiner* — Ariel Mercado
(74) *Attorney, Agent, or Firm* — Sughrue Mion, PLLC

(57) ABSTRACT

Methods and systems for predicting keystrokes using a neural network analyzing cumulative effects of a plurality of factors impacting the typing behavior of a user. The factors may include typing pattern, previous keystrokes, specifics of keyboard used for typing, and contextual parameters pertaining to a device displaying the keyboard and the user. A plurality of features may be extracted and fused to obtain a plurality of feature vectors. The plurality of feature vectors can be optimized and processed by the neural network to identify known features and learn unknown features that are impacting the typing behavior. Thereby, the neural network predicts keystrokes using the known and unknown features.

17 Claims, 12 Drawing Sheets

(51) Int. Cl.
*G06F 17/18* (2006.01)
*G06N 3/04* (2006.01)

(56) References Cited

U.S. PATENT DOCUMENTS

| | | | | |
|---|---|---|---|---|
| 9,760,559 | B2* | 9/2017 | Dolfing | G06F 40/274 |
| 9,785,630 | B2* | 10/2017 | Willmore | G06F 40/274 |
| 10,769,259 | B2 | 9/2020 | Baldwin et al. | |
| 10,872,203 | B2* | 12/2020 | Orr | G06F 3/0237 |
| 11,010,550 | B2* | 5/2021 | Bellegarda | G06N 3/0445 |
| 2009/0195506 | A1* | 8/2009 | Geidl | G06F 3/04886 |
| | | | | 345/168 |
| 2009/0281979 | A1 | 11/2009 | Tysowski | |
| 2011/0285555 | A1* | 11/2011 | Bocirnea | G06F 3/0237 |
| | | | | 341/34 |
| 2012/0223889 | A1* | 9/2012 | Medlock | G06F 40/274 |
| | | | | 345/173 |
| 2013/0044063 | A1 | 2/2013 | Kim | |
| 2013/0067382 | A1 | 3/2013 | Townsend et al. | |
| 2014/0310213 | A1 | 10/2014 | Badger et al. | |
| 2015/0186793 | A1 | 7/2015 | Ioffe et al. | |
| 2015/0317076 | A1 | 11/2015 | Goel et al. | |
| 2016/0299685 | A1* | 10/2016 | Zhai | G06F 3/04886 |
| 2017/0003878 | A1 | 1/2017 | Zhai et al. | |
| 2018/0107380 | A1 | 4/2018 | Kandur Raja et al. | |
| 2018/0307680 | A1 | 10/2018 | Wu et al. | |
| 2018/0349764 | A1 | 12/2018 | Zhang et al. | |
| 2019/0155504 | A1 | 5/2019 | Zhai et al. | |
| 2021/0405765 | A1* | 12/2021 | Jia | G06F 40/268 |

OTHER PUBLICATIONS

Communication dated Sep. 8, 2021 by the Intellectual Property Office of India in Indian Patent Application No. 201941022207.
Sharma, Nupur, "How does SwiftKey predict your next keystrokes?", Jan. 12, 2017, https://medium.com/@curiousNupur/how-does-swiftkey-predict-your-next-keystrokes-b048ef67267d. (5 pages total).
Communication dated Sep. 21, 2022 by the European Patent Office in European Patent Application No. 20897022.8.

* cited by examiner

METHODS AND SYSTEMS FOR PREDICTING KEYSTROKES USING A UNIFIED NEURAL NETWORK

CROSS REFERENCE TO RELATED APPLICATION

This application is based on and claims priority under 35 U.S.C. 119 to Indian Patent Provisional Application No. 201941022207 filed on Dec. 4, 2019, and Indian Non-provisional Application No. 201941022207 filed on Jun. 4, 2020, in the Indian Patent Office, the disclosures of which are herein incorporated by reference in their entireties.

1. FIELD

Embodiments herein relate to neural networks, and more particularly to methods and systems for predicting keystrokes based on a cumulative impact of a plurality of contextual features on typing behavior and typing pattern of individual users.

2. DESCRIPTION OF RELATED ART

There are multiple factors that impact the typing behavior of a user, in particular when the user types on a virtual keyboard displayed on a device. Each of the factors act as a contextual feature. Examples of contextual features include hand posture, device orientation, device motion, keyboard layout, touch position, character/word sequence, touch pattern classification, and so on. Currently, the devices utilize a plurality of models, in which each model of the plurality of models can individually detect particular contextual features. Examples of the models include a language model, a touch correction model, a posture model, a temporal model, a spatial model, and so on.

Each of these models can determine the impact of a particular contextual feature on typing behavior. Identifying the impact of each contextual feature on the typing behavior, and developing individual models to predict keystrokes the user had intended to type with respect to variations in specific contextual features may be challenging. At the model development stage, contextual features are customized to enable the models to detect and/or understand the contextual features, for example using data measured by the device, and predict keystrokes based on the contextual features. It is possible that certain contextual features will be missed during the development stage. In real-time scenarios, if a particular contextual feature critically impacts the typing behavior, and if the models in the device do not consider, detect, and/or understand the contextual feature, then accuracy of keystroke prediction can be adversely affected.

The models are insensitive to an overall context, which impacts the typing behavior of the user at a particular instant, as the models may be configured to detect specific contextual features. For example, the touch model is insensitive to the type of finger being used for typing, sensory data such as device orientation and tilt angle, semantic/syntactic patterns, and so on can be used. The posture model is insensitive to current device position, user movement, and so on. Therefore, to increase the sensitivity of the overall context, the device should include a greater number of models. Paradoxically, with an increase in the number of models in the device, the insensitiveness to the overall context decreases, thereby increasing the keystroke prediction error rate, which is determined by detecting whether user had pressed backspace after prediction. Further, the number of models in the device is directly proportional to the accuracy of keystroke prediction, computational load, memory requirement, and so on. As the models do not consider the overall context impacting the typing behavior, the models may not be adaptive to typing behaviors of individual users.

The language models, which are currently used for predicting subsequent characters of a word, subsequent words of a sentence, or predicting words to complete a sentence, performing auto-correction, and so on, are generally ¾-gram. The predictions of characters/words can be improved by increasing from ¾-gram to 7-gram or 10-gram. However, the increase can be achieved only by leveraging computational cost and/or memory resources of the devices. Currently, computational cost and/or memory resources act as constraints in improving the language model. Mobile devices, in particular, permit only a smaller footprint in terms of computational requirements and memory resources.

The models are statistical in nature and may be unable to identify characteristics specific to each user due to the statistical nature of the models. For example, some users may prefer using both thumbs for typing, some users prefer typing in landscape mode, and some users may be frequently typing while in motion, and so on. Understanding user individuality and dynamically adapting to diversity in typing behavior is therefore challenging for statistical models.

FIG. 1 is a diagram illustrating the prediction of a keystroke using a plurality of models. The prediction involves determining, using probabilistic techniques, whether a user intended to press a particular key. The prediction involves determining a joint probability, in which individual models determine individual probabilities of the user intending to press the particular key. Each of the models requires individual hardcoded interpolation weighting parameters for determining the individual probabilities. The values of the weighting parameters are generalized, and hence cannot be personalized for individual users.

The statistical nature of the models allows the models to accurately predict the keystrokes, if specific input data, which is necessary for individual models to predict keystrokes, is available. In real-time scenarios, the models may be unable to obtain such specific data. As a result, keystroke predictions of each model may be interpolated with the keystroke predictions of other models. These interpolations may adversely affect the outputs of the individual models and the accuracy of cumulative prediction (such as word or sentence) may decrease.

FIG. 2 is a diagram illustrating an example interpolation of probabilities determined by the plurality of models for predicting keystrokes. As depicted in FIG. 2, the device may include a plurality of models (a touch model, a device slant model, a user movement model, a posture model, and so on). The touch model identifies regions of a keyboard at which pressure has been detected. The touch model can utilize the keyboard layout to determine the region. The slant model identifies whether the device is in landscape/portrait mode, and tilt angle of the device. The user movement model determines whether there is user movement, acceleration/deceleration, while typing. The posture model identifies the finger, which is being used for typing. The models can extract limited, static information as the models operate.

Each model can impact the other models. For example, the touch model can be impacted by the posture model, device orientation, language model, device movement, word and character predictions, size of finger used for typing, and so on. The posture model can be impacted by the problems of occlusion, haptic feedback, device movement, device orientation, and so on. Therefore, the models may be unable to collectively understand the entire typing context.

When the user types a key, each of the plurality of models can individually determine probabilities of the user intending to type the particular key. The probabilities determined by each of the plurality of models may be different. The plurality of models can also determine the probability of the user intending to type at least one neighboring key. For each key, the probabilities, determined by each of the plurality of models, are interpolated to predict the keystroke. However, the interpolation of multiple models can limit typographical error correction and can cause incorrect keystroke prediction.

SUMMARY

Provided herein are methods and systems for predicting keystrokes using an on-device unified neural network, and boost the adaptability of the unified neural network to personalize keystroke predictions.

Additional aspects will be set forth in part in the description which follows and, in part, will be apparent from the description, or may be learned by practice of the presented embodiments.

An object of the embodiments herein is to obtain information representing cumulative effects of a plurality of factors impacting the typing behavior of at least one user, wherein the plurality of factors comprises at least one of contextual parameters pertaining to the device, contextual parameters pertaining to the at least one user, previous typing pattern of the at least one user, (previous) keystrokes, specifics of a virtual keyboard used for typing (displayed on the device), and so on.

An object of the embodiments herein is to extract a plurality of features, impacting the typing behavior of the at least one user, by data exploration, wherein the data exploration involves categorizing contextual information, keystrokes, keyboard specifics, and typing pattern, to at least one of temporal information, touch information, spatial information, and language information.

An object of the embodiments herein is to perform a fusion of the plurality of features to obtain a plurality of feature vectors; wherein the fusion is performed by normalizing and/or encoding each of the plurality of features and the plurality of feature vectors can be optimized and processed by the on-device unified neural network.

An object of the embodiments herein is to provide the plurality of feature vectors as input to enable the on-device unified neural network to identify known features and learn unknown features that are impacting the typing behavior, wherein the on-device unified neural network predicts keystrokes using the known and unknown features by identifying neighboring errors, and correct contextual (language) errors based on corrected neighboring errors.

Accordingly, the embodiments provide methods and systems for predicting keystrokes based on a cumulative impact of a plurality of features using an on-device unified neural network. Each of the plurality of features affects typing behavior of at least one user. The neural network can be trained offline using keystroke logs and a plurality of features which may be capable of affecting the typing behavior. The embodiments include determining a plurality of factors, which are affecting the typing behavior of the at least one user. The embodiments include determining the plurality of factors when keystrokes are received from the at least one user. The embodiments include obtaining information that represents the plurality of factors.

The embodiments include aggregating the information representing the plurality of factors affecting the typing behavior of at least one user. The embodiments include extracting a plurality of features from the aggregated information. The embodiments include exploring the aggregated information by analyzing the factors that are affecting the typing behavior of the at least one user. The embodiments include categorizing the plurality of factors into at least one category comprising temporal information, touch information, spatial information, language information, and so on. Each of the extracted plurality of features is defined with at least one category.

The embodiments include fusing the plurality of features to obtain a plurality of feature vectors. The embodiments include fusing the plurality of features by normalizing/encoding the plurality of features. The normalization is performed using factors, which are exclusive to each of the plurality of features. The features that are not numeric in nature can be encoded to feature vectors. The feature vectors can be processed and optimized by the neural network. The embodiments include providing the plurality of feature vectors to the neural network.

The embodiments include predicting keystrokes based on the feature vectors. The neural network can determine whether the extracted features are known or unknown. The neural network can identify and correct neighbor errors, and correct contextual errors relevant to language based on the feature vectors. The neural network can determine whether the features are known or unknown, based on the values of the feature vectors. If the features are found to be known, then the keystroke prediction will depend on previous keystroke predictions. If the features are found to be unknown, then the neural network can learn the unknown features.

The neural network captures hidden representations and local features of characters, based on factors affecting the typing behavior of the at least one user. The neural network can find long range dependencies and the factors affecting the typing behavior, by identifying the context of a typed word or a typed sentence. The neural network can predict characters and words based on previously typed characters/words and perform auto correction. The neural network can determine probabilities of the at least one user pressing a plurality of keys, wherein the at least one user had actually intended to press one of the keys, from amongst the plurality of keys. The neural network can compute the probabilities of the at least one user pressing different keys, based on the assessment of the known and/or unknown features. The key that is having the highest probability, amongst the probabilities of the at least one user pressing other keys, can be considered as the predicted keystroke. The embodiments include displaying the key having the highest probability.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
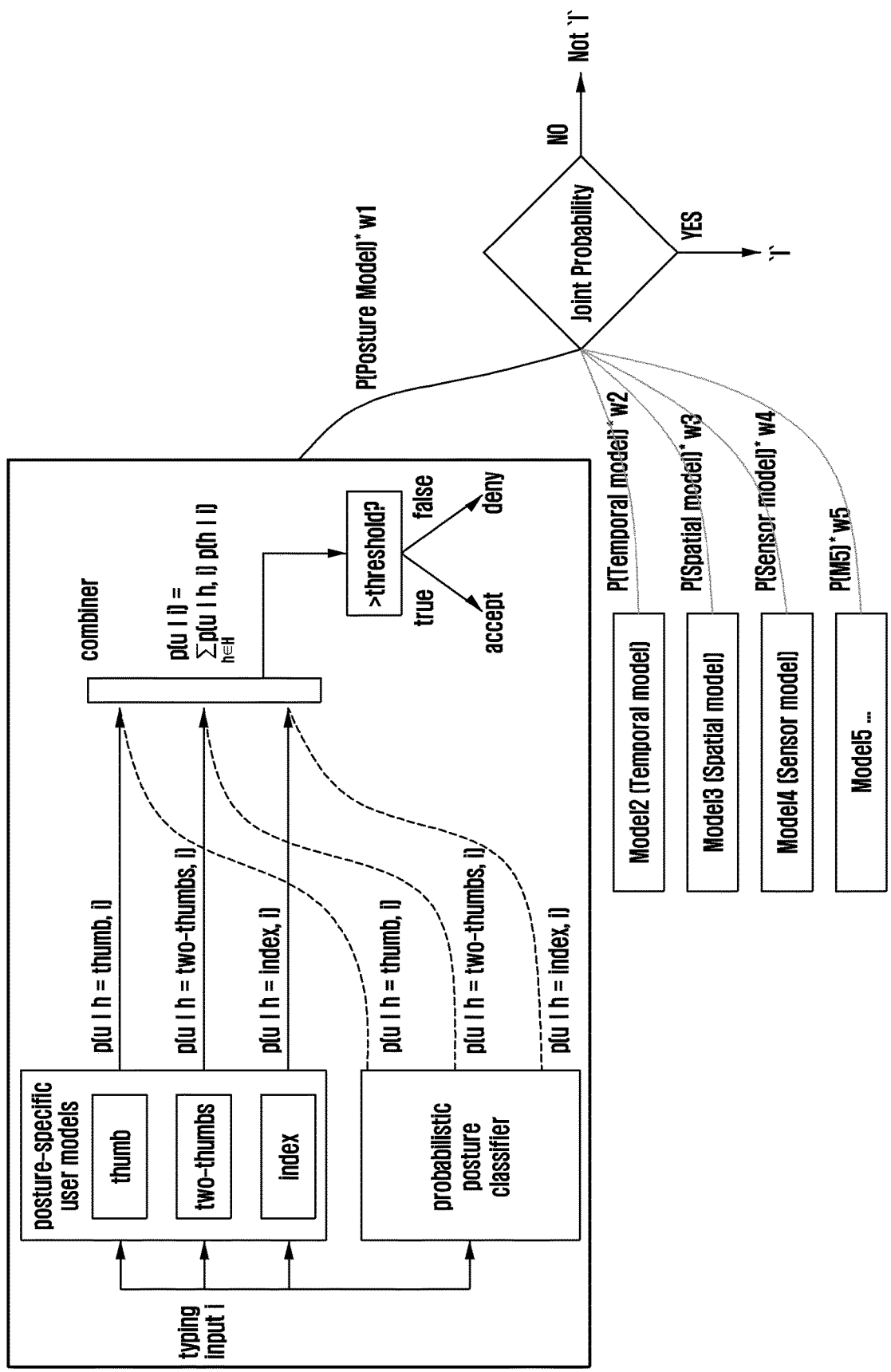
FIG. 1 is a diagram illustrating the prediction of a keystroke using a plurality of models.
Figure 2:
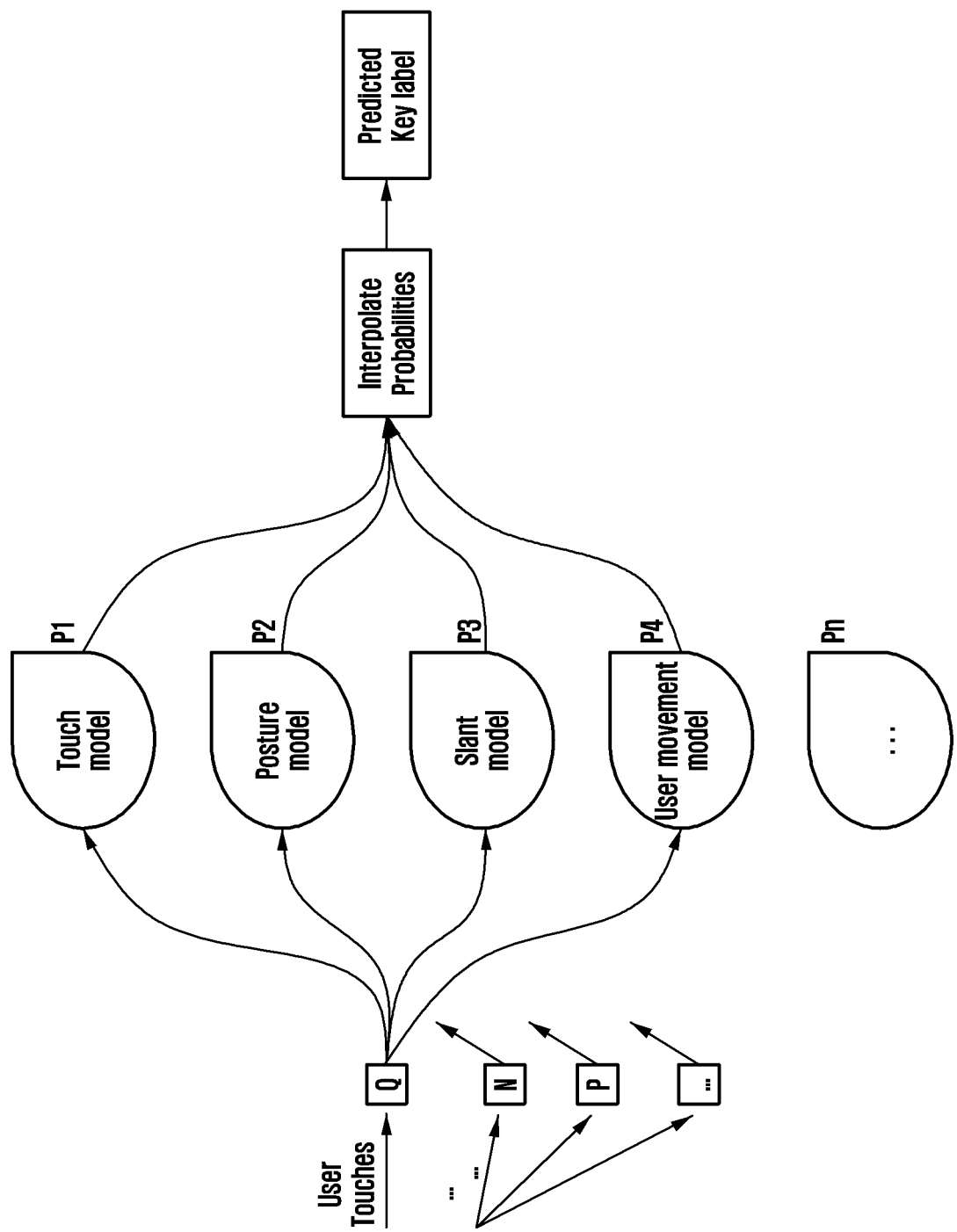
FIG. 2 is a diagram illustrating an example interpolation of probabilities determined by the plurality of models for predicting keystrokes.

The embodiments herein and the various features and advantageous details thereof are explained more fully with reference to the non-limiting embodiments that are illustrated in the accompanying drawings and detailed in the following description. Descriptions of well-known components and processing techniques are omitted to avoid unnecessarily obscuring the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein relate to methods and systems for predicting, using a unified neural network, keystrokes based on a cumulative impact of a plurality of features on typing behavior and typing pattern of at least one user. The embodiments include boosting adaptability of the unified neural network for personalizing keystroke predictions. The embodiments include determining factors that affect the typing behavior of the at least one user. The factors include characteristics of the device, contextual parameters pertaining to the device and the at least one user, parameters pertaining to typing posture and typing position of at least one user, specifics of a virtual keyboard displayed on the device, previous keystrokes, typing pattern of the at least one user, and so on.

The embodiments include performing data exploration for extracting the plurality of features that affect the typing behavior of the at least one user. During the data exploration, the factors that affect the typing behavior of the at least one user can be categorized as temporal information, touch information, spatial information, and language information. The embodiments include fusing the plurality of features to obtain a plurality of feature vectors. In an embodiment herein, each of the plurality of features can be normalized using factors, exclusive to each of the plurality of features. In an embodiment herein, the plurality of features can be encoded for fusing the plurality of features. The embodiments include providing the plurality of feature vectors as input to the unified neural network.

The plurality of feature vectors can be processed and optimized for discovering features that affect the typing behavior. Some of these discovered features are determined to be known. Some of these discovered features are determined to be unknown. The unified neural network can learn the unknown features, which can boost the adaptability of the unified neural network. The unified neural network can predict keystrokes using the known and unknown features, by identifying neighboring errors and correcting contextual language errors, which can improve the typing experience of the at least one user.

Referring now to the drawings, and more particularly to FIGS. 3 through 8, in which similar reference characters denote corresponding features consistently throughout the figures, there are shown preferred embodiments.

Figure 3:
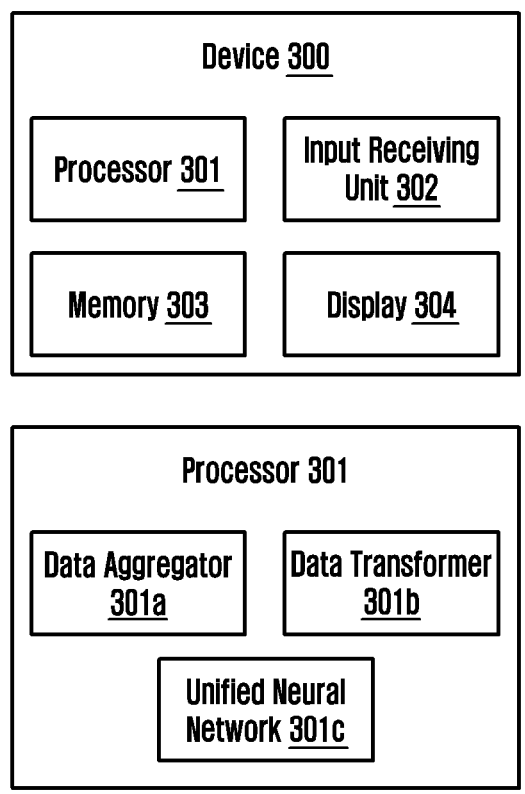
FIG. 3 is a block diagram illustrating a device configured to predict keystrokes using a unified neural network, based on a cumulative impact of a plurality of features on typing behavior of at least one user, according to an embodiment.

FIG. 3 is a block diagram illustrating a device configured to predict keystrokes using a neural network, based on a cumulative impact of a plurality of features on typing behavior of at least one user, according to an embodiment. As depicted in FIG. 3, the device 300 includes a processor 301, an input receiving unit 302, a memory 303, and a display 304. As also shown in FIG. 3, the processor 301 further includes a data aggregator 301a, a data transformer 301b, and a unified neural network 301c. The unified neural network 301c can be referred to as a Key-Net model. The device 300 is capable of displaying a virtual keyboard on the display 304. The display 304 can be sensitive to touch of the user. Examples of the device 300 include, but are not limited to, a mobile phone, a tablet, a laptop, an Internet of Things (IoT) device, or any device with at least one touch display capable of electronically displaying a keyboard thereon. The device 300 can predict keystrokes received from at least one user using the virtual keyboard, by deriving a plurality of features affecting the typing behavior when keystrokes are detected. The derived plurality of features are analyzed for determining the cumulative impact of the plurality of features on the typing behavior of the at least one user at a given time. The device 300 is configured to predict personalized keystrokes by boosting adaptability of the unified neural network 301c.

The device 300 can obtain information including factors, which are capable of affecting the typing behavior of at least one user. The obtained information includes, but is not limited to, characteristics of the device 300, contextual parameters pertaining to the device 300, contextual parameters pertaining to the at least one user of the device 300, specifics of a keyboard displayed on the device 300, keystroke details, touch information, and so on. The characteristics of the device 300 include type of display 304, bezel size, presence of edge displays, and so on. The contextual parameters pertaining to the device 300 include parameters measured by the device 300 (using accelerometers, gyrators, magnetometers, sensors, and so on), such as device orientation, speed of movement of the device 300, touch pressure, current tilt angle of the device, and so on. The contextual parameters pertaining to the at least one user include typing posture and typing position of at least one user. The typing posture includes a number of hands being used by the user for typing, a number of fingers being used by the user for typing, a type of finger (index, thumb, and so on) being used by the user for typing, a typing speed of the user, and a size of finger(s) being used by the user for typing. The typing position of at least one user includes user activity during typing, such as standing, walking, or commuting.

The specifics of the virtual keyboard displayed on the device 300 include keyboard layout size (width and height), key size (size of the keys of the keyboard), keypad type (example: QWERTY, ABCDE) and sub-keypad type (example: EN_US, EN_UK), key position, and so on. The keystroke details include characters and words typed by the user. The touch information can include touch position (x, y), touch size (major and minor values (considering finger contact with a key on the display 304 to be elliptical in shape, the touch size of that ellipse is measured using major and minor axis values)), inter-key timestamp (time interval between a current and a previously entered key) and intra-key timestamps (time difference between touch down and touch up event of the current key), which can specify or may be indicative of the typing pattern of each of the at least one user.

The input receiving unit 302 can receive keystrokes from the at least one user. The input receiving unit 302 can detect touch pressure on the display 304 during keystroke reception. When a keystroke is received, the data aggregator 301a of the processor 301 aggregates the information (characteristics of the device 300, contextual parameters pertaining to the device 300 and the at least one user, specifics of a virtual keyboard displayed on the device 300, keystroke details, touch information) representing the factors affecting the type behavior of the at least one user, from whom the keystrokes are received.

In an embodiment, the device 300 can send the aggregated information to a remote device such as a server or a cloud storage. The cloud storage includes a data repository, which includes data representing the same factors and/or additional factors, which have been previously obtained from the device 300. The repository also includes previously aggregated data, which was obtained during the reception of previous keystrokes from at least one user. The remote device may utilize the previously aggregated data to train the unified neural network 301c.

Prior to the deployment of the unified neural network 301c in the device 300, the remote device had used only the previously aggregated data to train the unified neural network 301c. Once the unified neural network 301c is deployed in the device 300, the remote device can utilize the aggregated information received from the device 300 and the previously aggregated data to further train the unified neural network 301c and improve the accuracy of the unified neural network 301c.

The data transformer 301b of the processor 301 can collect the aggregated information, currently representing the factors that are affecting typing behavior, from the memory 303. The data transformer 301b can extract features from the aggregated data and generate feature vectors through feature fusion. The data transformer 301b can explore the aggregated information to extract the plurality of features, which are affecting the typing behavior of the at least one user. During the data exploration, the data transformer 301b can analyze the factors affecting the typing behavior of the at least one user.

The analysis may involve categorizing the factors (contextual information, keystrokes, keyboard specifics, typing pattern, and so on) into at least one of temporal information, touch information, spatial information, and language information. The extracted plurality of features can be defined using at least one category. Example extracted features are finger tremor, infrequent letters (z, x), posture, character representations, average threshold time gap for correct/wrong touch position, word semantics, user typing pattern, key logs, user movement (walking/commuting/sitting), habituated typos specific to the at least one user, and so on.

The data transformer 301b can fuse the plurality of features to obtain a plurality of feature vectors. The data transformer 301b can learn all the features without exhaustive data preparation for each feature, and without building individual models for learning every feature. The data transformer 301b can optimally learn all features (such as typing sequence's lexicon, context, layout, device, sensor information, and so on) and convert the aggregated data into a single data set.

The data transformer 301b can fuse the plurality of features by normalizing each of the plurality of features and/or encoding the plurality of features. The normalization of the plurality of features can be performed using factors, which can be exclusive to each of the plurality of features. For example, consider that touch position (feature) coordinates extracted during three different instances of keystroke reception are (164, 164), (755, 515), and (189, 196). The normalized touch positions will be 0.3, 0.7, and 0.35. The normalized touch positions represent the touch position feature vector. The plurality of features that cannot be represented using numerical values can be encoded to obtain feature vectors, which can be processed and optimized by the unified neural network 301c.

The data transformer 301b can provide the plurality of feature vectors as input to the unified neural network 301c. In an embodiment, the unified neural network 301c includes at least one Convolutional Neural Network (CNN), at least one forward Long/Short-Term Memory Network (LSTM), at least one backward LSTM, at least one batch normalizer, and an activation layer. The plurality of feature vectors (inputs to the unified neural network 301c) can be processed and optimized for exploring the features that are affecting the typing behavior. The at least one CNN, at least one forward LSTM and the at least one backward LSTM can determine known and unknown representations from the inputs (feature vectors), which can be used for identifying and correcting neighboring errors and correcting contextual errors relevant to language (words/sentences/phrases).

The remote device can utilize the aggregated data received from the device 300 and the previously aggregated data, stored in the repository, to train the unified neural network 301c. The remote device may utilize the previously aggregated data to extract a plurality of features. The remote device can determine whether the features are known/unknown. The remote device can learn the unknown features and determine whether the weights of the unified neural network 301c need to be updated. If the weights of the unified neural network 301c need to be updated, the remote device can notify the device 300 to update the unified neural network 301c.

The feature vectors are first provided to the at least one CNN, followed by the at least one forward LSTM and the at least one backward LSTM. The at least one CNN, at least one forward LSTM and at least one backward LSTM can learn multi-type (known or unknown) features that are affecting the typing behavior of the at least one user. The at least one CNN can capture hidden representations and local features of characters, based on factors (contextual information pertaining to the at least one user and the device 300, keystrokes, keyboard specifics, and typing pattern) affecting the typing behavior of the at least one user. The at least one CNN can create (learn) a unified feature representation of feature inputs, i.e., the factors affecting the typing behavior. The at least one CNN is configured to correct neighboring errors based on whether the features are known or unknown.

The at least one forward LSTM and the at least one backward LSTM can find long range dependencies and the factors affecting the typing behavior, by identifying the context of a typed word or a typed sentence, to predict characters of a word (to complete the word prior to the user typing the characters) and words in a sentence/phrase (to complete the sentence/phrase prior to the user typing the words) based on previously typed characters and words, and perform auto correction.

The batch normalizer can prevent the overfitting of the unified neural network 301c. The activation layer can determine the probabilities of the at least one user pressing at least one key, wherein the at least one user had actually intended to press one of the keys, from amongst the plurality of keys. The activation layer can compute the probabilities of the at least one user pressing at least one key, based on the assessment of the features (known or unknown) and the factors that are affecting the typing behavior of the at least one user. The key that is having the highest probability, amongst the probabilities of the at least one user pressing other keys, can be considered as the predicted keystroke. The processor 301 can cause the key to be displayed on the display 304.

The keystroke prediction is considered as accurate if the key having the highest probability is the key pressed by the at least one user. The processor 301 can verify the accuracy of prediction based on the action of the at least one user after the predicted key is displayed on the display 304. If the at least one user presses the 'backspace' key after the predicted key is displayed, the prediction can be considered as inaccurate.

In an example, consider that a user intended to type "Unclear way." Consider that there is a neighboring error, in which "Unclear wat" will be displayed. This is because touch pressure is detected on the right region (touch position on the virtual keyboard) of the key 'T' and the left region of the key 'Y.' In this scenario, the CNNs determine the feature vector, which corresponds to the contextual information pertaining to the user of the device 300. Consider that the contextual information is type of finger being used for typing. The CNNs determine (based on the feature vector corresponding to typing posture) that the user is typing with the left thumb. Since the left thumb is being used, it is likely that the touch pressure will be detected at the left region of a key, which the user is intending to type. In this instance, it is the key 'Y.' Therefore, the CNNs cause the key 'Y' to be displayed, instead of the key 'T.'

For the sake of simplicity, a single factor (typing posture) has been considered as an example by the CNN to correct the neighboring error. The CNNs can consider multiple factors to determine the key, which the user intended to press, and correct neighboring errors.

In another example, consider that a user intended to type "Mix pepper" and has typed "Mix peoper." In this scenario, the context of the phrase can be misunderstood. This can lead to improper auto-correction. Consider that the "Mix peoper" is autocorrected to "Mix proper." However, the actual intention of the user is to type "Mix pepper," in which the user had intended to press the key 'p,' but instead pressed the key 'o' by mistake. The auto-correction is performed based on the assumption of an existing neighboring error, in which the user intended to press the key 'r,' but instead pressed the key 'e' by mistake. The auto-correction can degrade the user experience. In this scenario, the forward LSTM and/or the backward LSTM can understand the context of the phrase, which is a step in a recipe. Therefore, 'peoper' should be replaced with 'pepper.' The forward LSTM and/or the backward LSTM perform the appropriate auto-correction, which involves performing neighboring error correction, in which the key 'o' is replaced by the key 'p' in the phrase "Mix peoper." The autocorrected phrase will be "Mix pepper." Thus, CNNs can be used for correcting the neighboring error.

If the user intents to type an emoji, then there should be no neighboring error and any auto-correction (if necessary) should be appropriate. Based on a displayed word, an emoji corresponding to the word is fetched. If a word displayed on the display 304 is not intended by the user, an inappropriate emoji may be fetched, which may degrade the user experience. By appropriate auto-correction (using the forward and/or the backward LSTMs) and neighboring error correction (using the CNNs), the word displayed on the display 304 will actually be intended by the user. Therefore, an appropriate emoji will be fetched, which will enhance the user experience.

FIG. 3 shows exemplary units of the device 300, but the configuration and components of the device 300 illustrated in FIG. 3 are not so limited. In other embodiments, the device 300 may include fewer or additional components. Further, the labels or names of the units are used only for illustrative purpose and do not limit the scope of the embodiment. One or more units can be combined together to perform a same or substantially similar function in the device 300.

Figure 4:
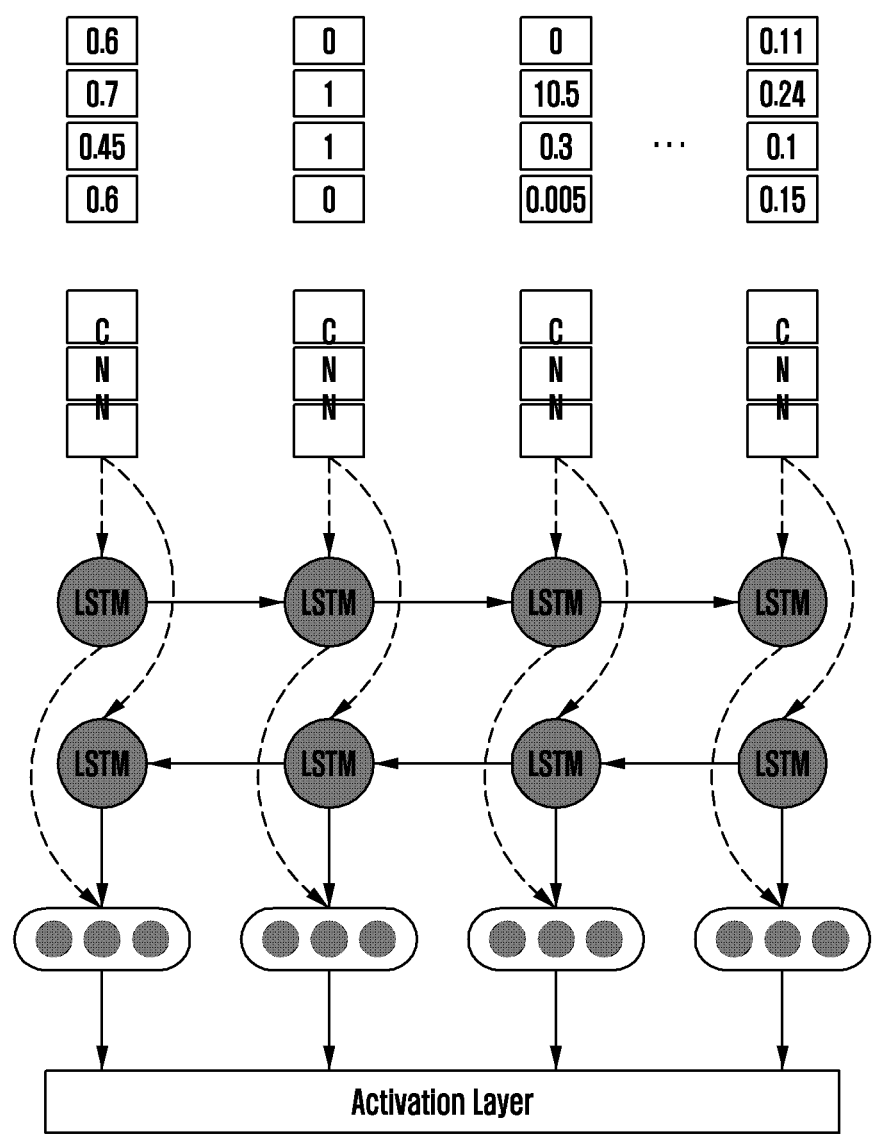
FIG. 4 is a diagram illustrating an example architecture of a key-net model (unified neural network), according to an embodiment.

FIG. 4 is a diagram illustrating an example architecture of the key-net model (unified neural network 301c), according to an embodiment. As depicted in the example in FIG. 4, the architecture comprises four CNNs, four forward LSTMs, four backward LSTMs, four batch normalizers, an activation layer, and an output layer. The number of CNNs, forward LSTMs, backward LSTMs, and batch normalizers depicted in FIG. 4 are merely examples, and the number of CNNs, forward LSTMs, backward LSTMs, and batch normalizers in the unified neural network 301c can be of any suitable number and configuration.

In an example, consider that four feature vectors, touch positions, previous character position, sensor data, and temporal features, are supplied as input to the unified neural network 301c. The unified neural network 301c analyzes the cumulative effects of the four feature vectors on the typing behavior of a user, for accurately predicting keystrokes. The feature vectors, viz., touch position and the sensor data, have been obtained through normalization of their respective feature counterparts, using factors, which are unique (specific) to touch position and sensor data. The feature vectors, viz., previous character position and temporal features, have been obtained by encoding the respective feature counterparts.

The normalized features and the encoded features can be processed and optimized by the CNNs, the forward LSTMs and the backward LSTMs. The CNNs can receive the feature vectors and capture hidden representations and local features of typed characters based on the factors that are affecting the typing behavior of the user. The CNNs correct neighboring errors based on the values of the input feature vectors.

The forward LSTMs and the backward LSTMs find long range dependencies that are affecting the typing behavior, by identifying the context of a typed word/sentence. The forward LSTMs and the backward LSTMs predict characters required to complete one or more words, in which the prediction is based on characters/words that have been previously typed and are being displayed, in which the characters that have been displayed have been ascertained to be the characters the user had intended to type. The forward LSTMs and the backward LSTMs predict words to complete a sentence/phrase, in which the prediction is based on words that have been already typed and are being displayed. The characters of the words in the portion of the sentence/phrase, which have been displayed, are run through language and neighboring error checks.

The CNNs, the forward LSTMs, and the backward LSTMs extract unknown representations from the input feature vectors to identify and correct neighbor errors, and correct contextual language errors such as incorrect prediction of characters/words and faulty auto-corrections. The CNNs, the forward LSTMs, and the backward LSTMs enable the unified neural network 301c to adapt to unknown features to make keystroke predictions.

The batch normalizer prevents overfitting by the CNNs, the forward LSTMs, and the backward LSTMs. In an embodiment, the keystroke prediction involves determining the probability of the user intending to press a particular key. The activation layer can compute the probabilities of the user intending to press different keys. The probabilities can be represented in a vector form, in which the magnitudes of the dimensions of the vector indicate the probabilities of the user intending to press the respective keys. For example, consider that the activation layer can compute the probabilities of the user intending to type the keys T, Y, U, G, H, J, B, and N. The computation of the probabilities of the user pressing these specific keys is based on the assessment of the factors that are affecting the typing behavior of at least one user.

Consider that the user had actually intended to press the key 'H.' Therefore, the CNNs, based on the factors affecting the typing behavior, compute the probabilities of the user intending to press the keys T, Y, U, G, J, B, and N. The key that is having the highest probability can be considered as the predicted keystroke, i.e., the key that is having the highest probability is the key that the user had intended to press. As the user had intended to press the key the probability that the user intending to press the key 'H' is highest amongst the probabilities of the user intending to press the keys T, Y, U, G, J, B, and N. The key 'H' is sent to the output layer, which is then displayed on the display 304.

Figure 5A:
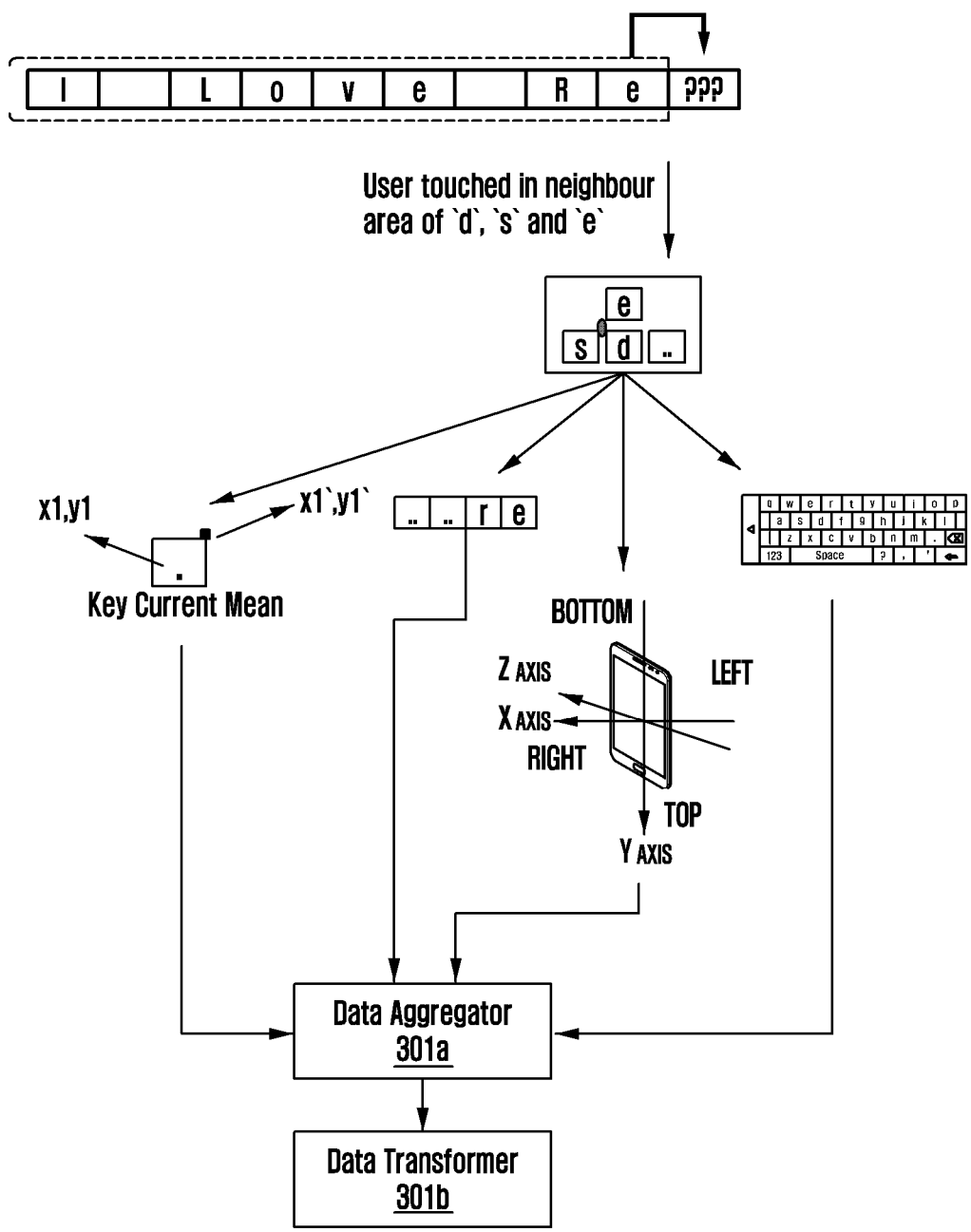
FIGS. 5A, 5B, and 5C are diagrams illustrating prediction of a keystroke, by the unified neural network, based on probability of a user intending to press a particular key, according to an embodiment.
Figure 5B:
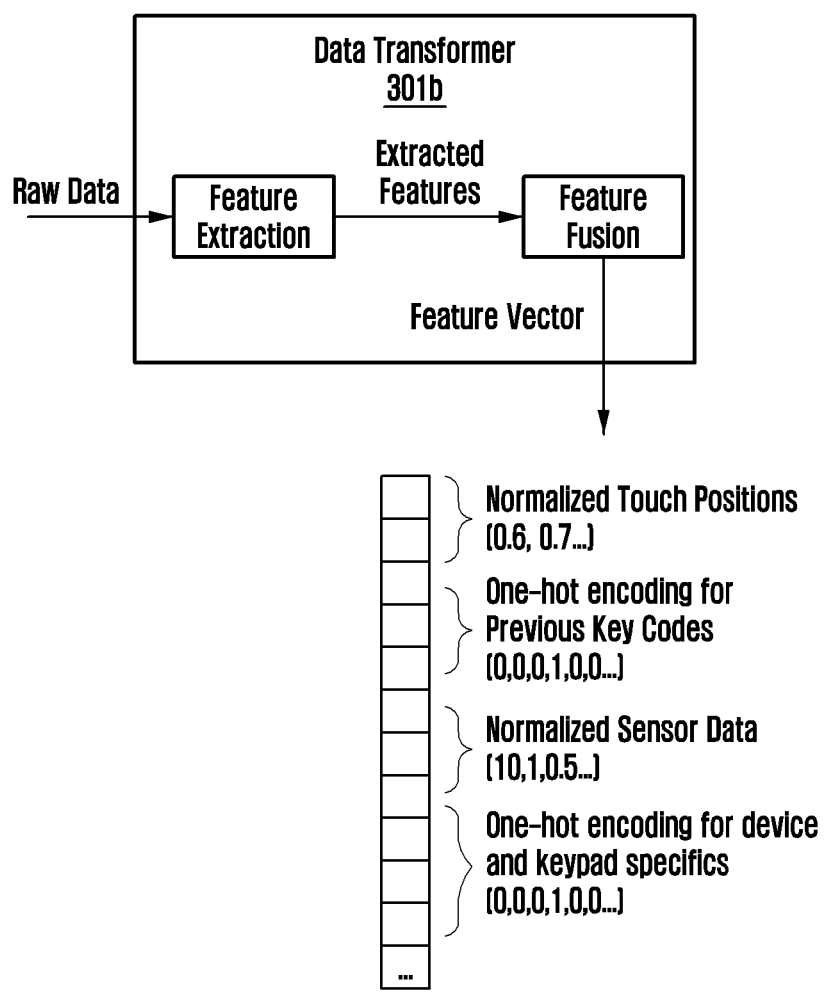
Figure 5C:
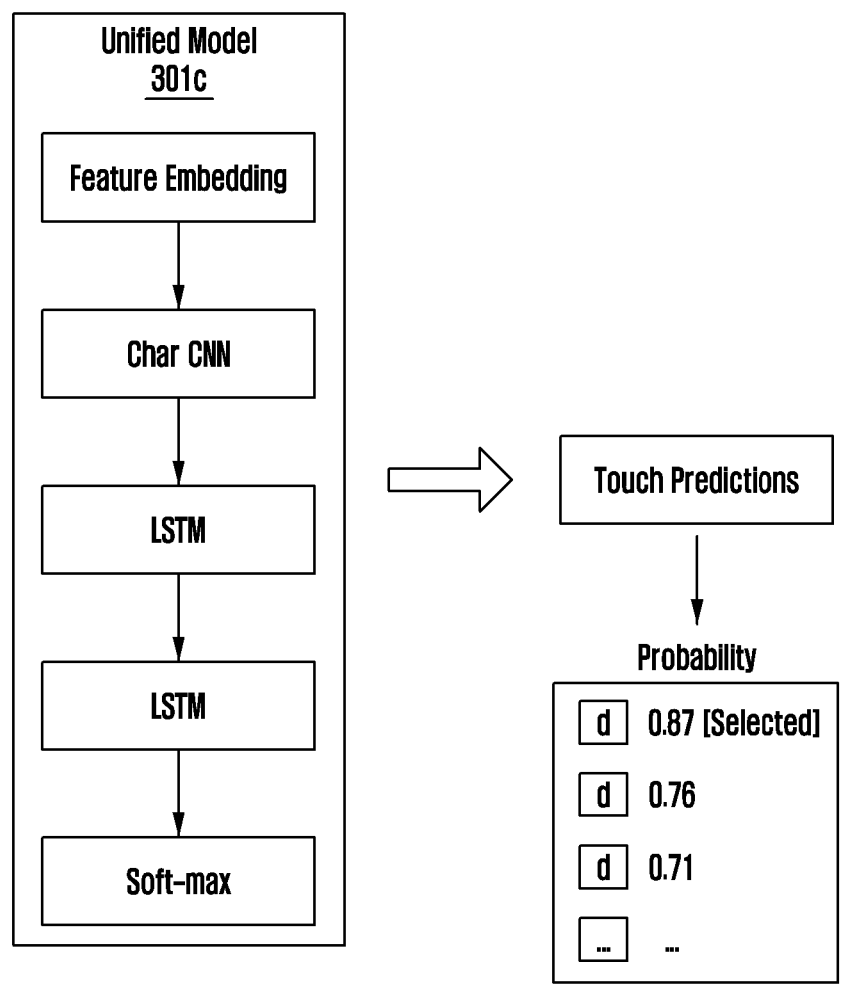

FIGS. 5A, 5B, and 5C are diagrams illustrating an example method for predicting a keystroke based on probability of a user intending to press a particular key, according to an embodiment. As depicted in FIG. 5A, consider that the user had typed "I love Re." Consider that the user had intended to press the key 'd,' to complete the phrase "I love Red." However, the touch position is in a region of the virtual keyboard, in which the user touch pressure is detected on regions covering portions of the keys 'S,' 'E,' and 'D.' to determine the intent of the user, the data aggregator 301a can aggregate factors which had caused the user to press (typing behavior) the region of the virtual keyboard covering the portions of the keys 'S,' 'E,' and 'D.'

Consider that the aggregated factors are user touch position(s), previously typed character(s), sensor data, and keypad layout details. The aggregated data can be provided to the data transformer 301b. As depicted in FIG. 5B, the data transformer 301b can perform feature extraction and feature fusion on the aggregated data. The data transformer 301b can extract the features by exploring the aggregated data. Thereafter, the data transformer 301b can fuse the features corresponding to the factors affecting the typing behavior, to obtain feature vectors. The fusion can be performed by normalizing one or more of the features, while the remaining features are encoded. For example, user touch position(s) and sensor data are normalized, and previously typed character(s) and keypad layout details are encoded.

As depicted in FIG. 5C, the feature vectors can be embedded to the unified model 301c (neural network). The unified model 301c includes a CNN layer, a forward LSTM layer, a backward LSTM layer, and a softmax layer. The softmax layer can be considered as the activation layer. The CNN, the forward LSTM and the backward LSTM can extract known and unknown representations from the feature vectors to identify and correct neighbor errors, and correct contextual language errors.

The weights of the unified model 301c can be updated based on aggregated data and previously aggregated data. The remote device can utilize the aggregated data and the previously aggregated data to extract features, which can be known or unknown. The remote device can identify the unknown features that are affecting the typing behavior of the at least one user. Based on the learned features, the weights of the unified model 301c can be updated. Once the weights have been updated, the unified model 301c can predict keystrokes based on the input feature vectors.

The CNN captures hidden representations and local features of the characters, based on the user touch position(s), the previously typed character(s), the sensor data, and the keypad layout details. The CNN can correct neighboring errors based on the values of the feature vectors. The forward LSTM and the backward LSTM can find long range dependencies by identifying the context of a typed word or a typed sentence. The forward LSTM and the backward LSTM can predict characters and words based on the previously typed characters and words, and perform auto correction of the previously typed characters/words.

The softmax can determine the probabilities of the user pressing the keys 'S,' 'E,' 'D' (as depicted), 'X,' 'C,' 'F' and 'R'. The probabilities of the user pressing the keys 'S,' 'E,' and 'D' are higher than the probabilities of the user pressing the keys 'X,' 'C,' 'F' and 'R.' The probabilities are computed based on the assessment of the neighboring errors (user pressing either of the keys 'S,' 'E,' 'X,' 'C,' 'F' and 'R') and the context of the typed phrase "I love Re." The probability of the user pressing the key 'D' is highest (0.87), amongst the probabilities of the at least one user pressing other keys. The probabilities of the user pressing the keys 'S' and 'E' are 0.76 and 0.71 respectively. The unified model 301c provides key 'D' as the touch (keystroke) prediction.

Figure 6:
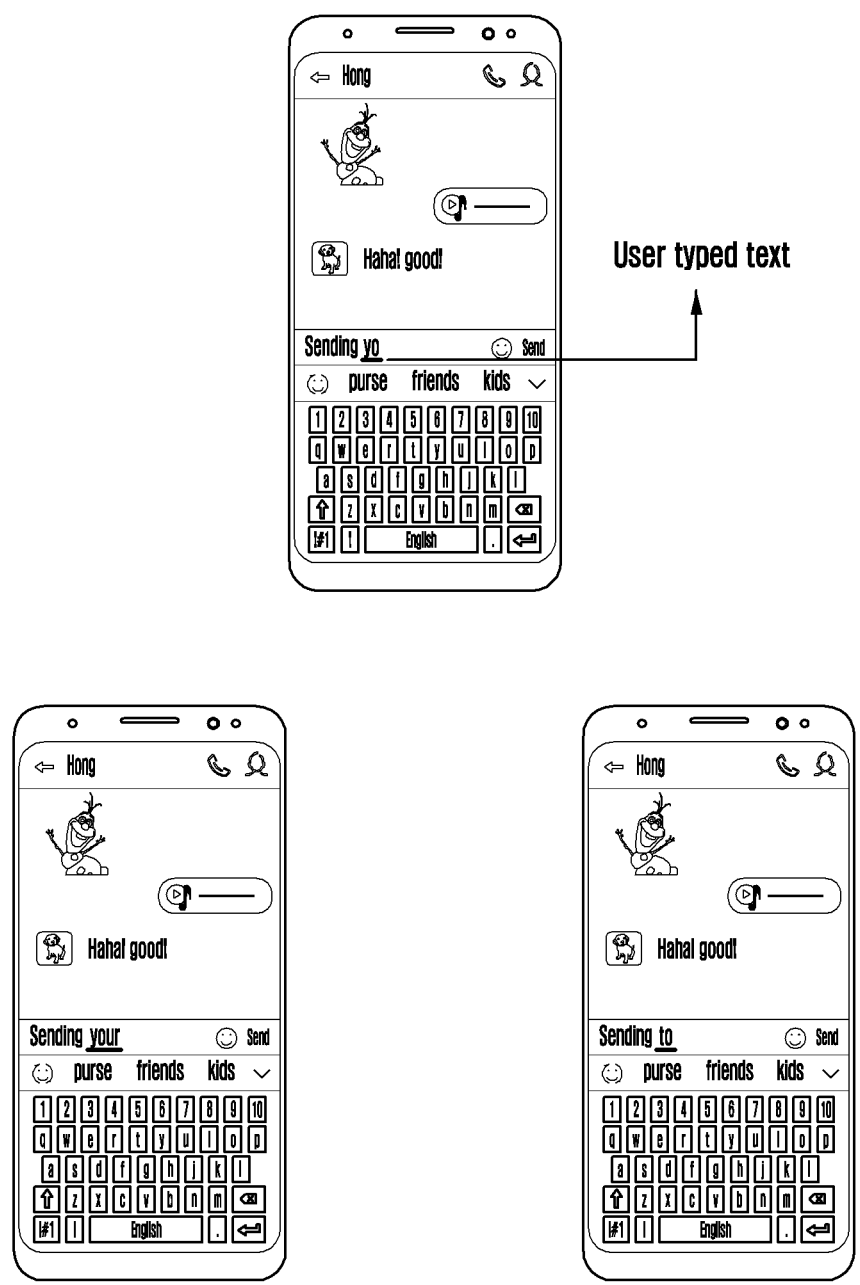
FIG. 6 is a diagram illustrating appropriate auto-correction by the unified neural network, according to an embodiment.

FIG. 6 is a diagram illustrating the unified neural network 301c performing the appropriate auto-correction, according to an embodiment. Consider that the user intended to type "Sending to." The user had made a typo error and has typed "Sending yo." The user had intended to press the key 'T,' but instead pressed the key 'Y' by mistake. The at least one forward LTSM and the at least one backward LSTM can determine the context based on the previous words (such as 'Sending'). If the context is not determined, then "Sending yo" may be autocorrected to "Sending your." The at least one forward LSTM and the at least one backward LSTM can perform the appropriate auto-correction, which involves replacing by the key 'Y' with the key 'T.'

Figure 7:
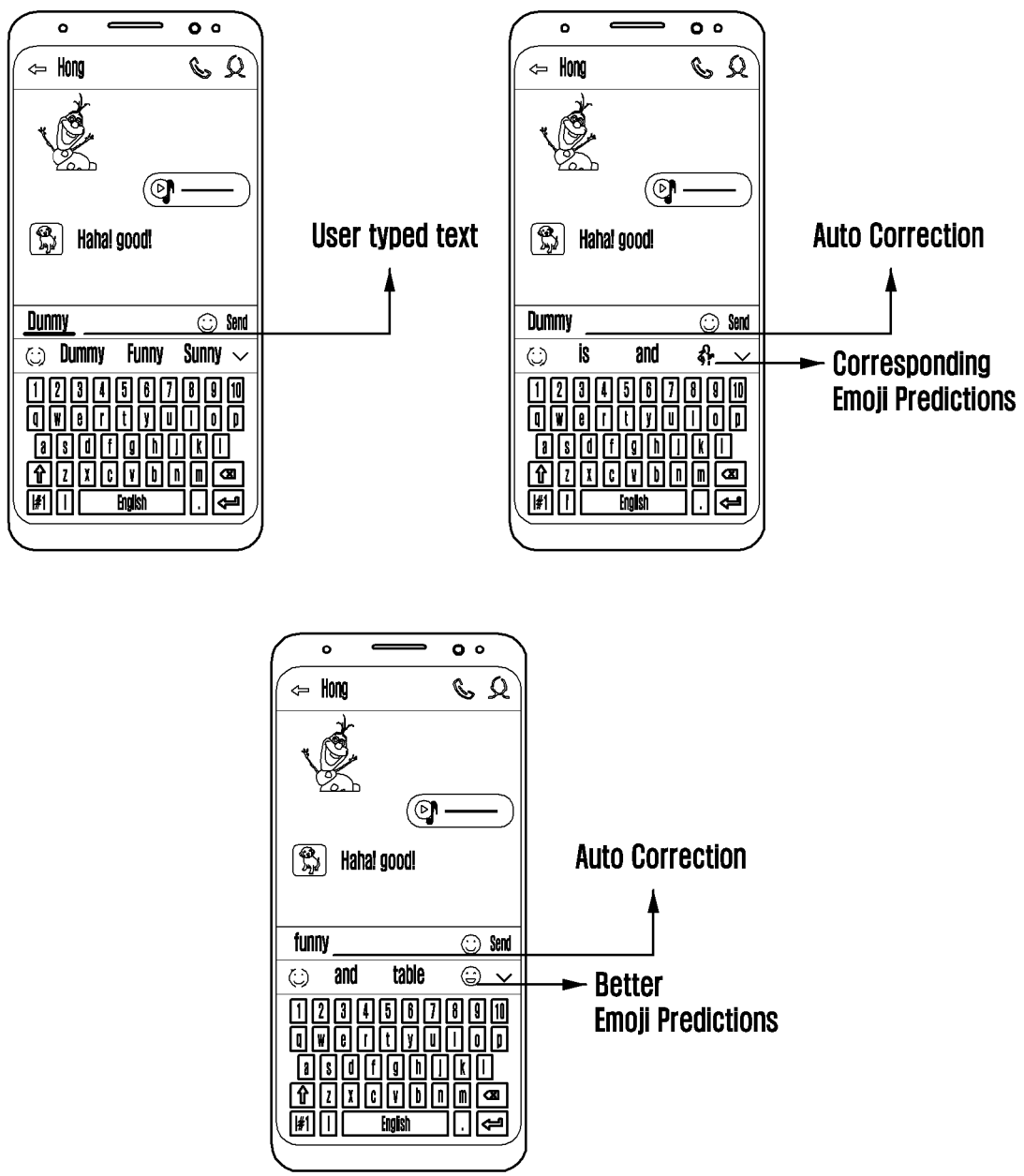
FIG. 7 is a diagram illustrating fetching of appropriate emojis due to appropriate auto-correction by the unified neural network, according to an embodiment.

FIG. 7 is a diagram illustrating fetching of an appropriate emoji due to appropriate auto-correction by the unified neural network 301c, according to an embodiment. The processor 301 can fetch the emoji corresponding to a word/ phrase typed by the user. Consider that the user intended to type "Funny." The user had made two errors while typing, and instead typed "Dunmy." The first character and the fourth character are erroneous. Considering the first character, the user had intended to press the key 'F,' but instead pressed the key 'D.' The user continued to type and, intending to press the key 'n,' pressed the key 'm.' The nature of the overall error can be misunderstood as a neighboring error, wherein the key 'n' in "Dunmy" is replaced by the key "m." The correction of the 'neighboring error' leads to replacement of "Dunmy" to "Dummy." This will lead to fetching of inappropriate emoji (which corresponds to "Dummy"). By appropriate auto-correction using the at least one CNN, at least one forward LSTM, and the backward LSTM, the word displayed on the display 304 will be "Funny." Therefore, an appropriate emoji will be fetched.

Figure 8:
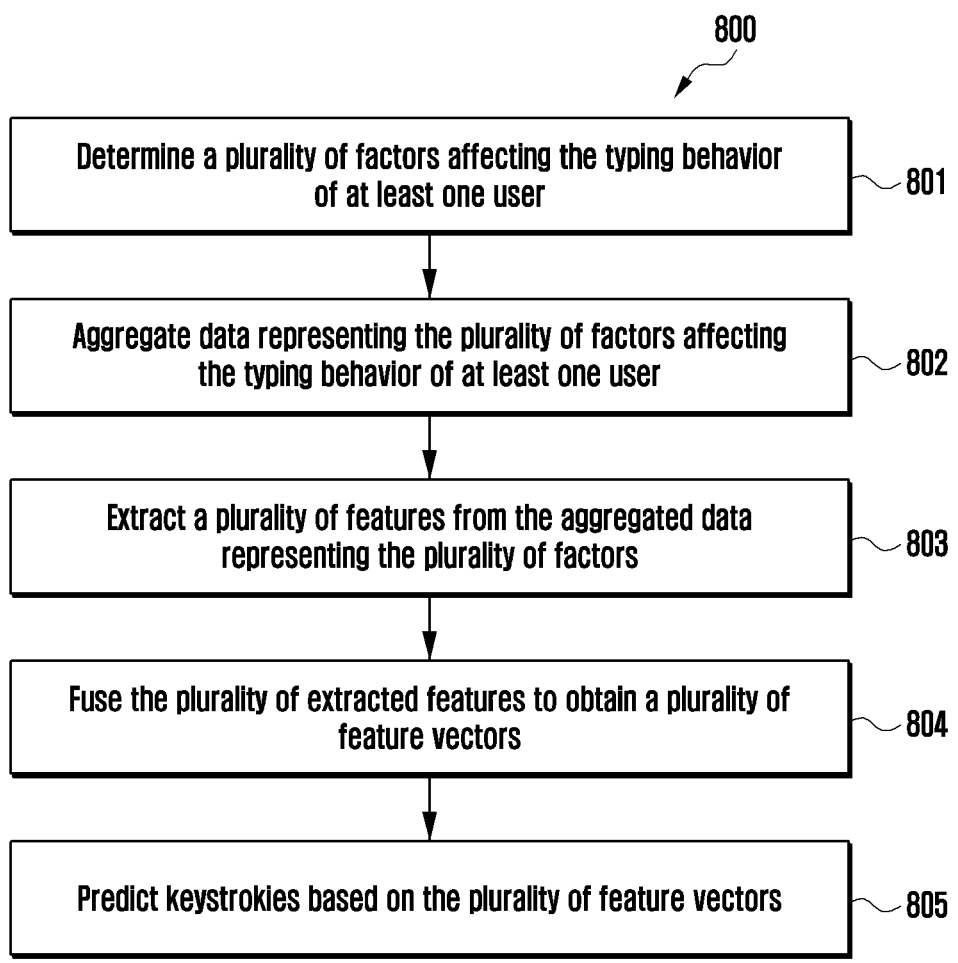
FIG. 8 is a flowchart illustrating a method for predicting keystrokes based on a cumulative impact of a plurality of features on typing behavior of at least one user, according to an embodiment.

FIG. 8 is a flowchart 800 illustrating a method for predicting keystrokes based on a cumulative impact of a plurality of features on typing behavior of at least one user, according to an embodiment. At step 801, the method includes determining a plurality of factors affecting the typing behavior of at least one user. The embodiments include determining the plurality of factors, when keystroke(s) are received from the at least one user. The embodiments include obtaining information that can represent the plurality of factors affecting the typing behavior. The obtained information includes characteristics of the device 300, contextual parameters pertaining to the device 300, contextual parameters pertaining to the at least one user, specifics of a keyboard displayed on the device 300, keystroke details, touch information, and so on.

The characteristics of the device 300 include parameters such as type of display 304, bezel size, presence of edge displays, and so on. The contextual parameters pertaining to the device 300 include parameters such as orientation of the device 300, speed of movement of the device 300, tilt angle, touch pressure, and so on. The contextual parameters pertaining to the at least one user include typing posture (number of fingers used for typing, type of finger used for typing) and position of at least one user (standing, walking, or commuting) when the at least one user is typing. The specifics of the virtual keyboard displayed on the device 300 include keyboard layout size, key position, keypad type, sub-keypad type, key size, and so on. The keystroke details include characters and words typed by the user. The touch information comprises inter-key and intra-key timestamps, touch position, and so on.

At step 802, the method includes aggregating data representing the plurality of factors affecting the typing behavior of at least one user. The aggregated data is a consolidation of the obtained information comprising contextual parameters pertaining to the device 300, contextual parameters pertaining to the at least one user, specifics of a keyboard displayed on the device 300, keystroke details, touch information, and so on. The embodiments include sending the aggregated data to a remote device such as a server or a cloud. The remote device can store the aggregated data, received from the device 300, in a data repository. The data repository includes previously aggregated data, which represent the factors that have previously affected the typing behavior of the at least one user and aggregated data used for training the unified neural network 301c. With continued usage of the keyboard the amount of information stored in the repository increases.

At step 803, the method includes extracting a plurality of features from the aggregated data representing the plurality of factors. The embodiments include performing an exploration of the aggregated data to analyze the factors that are affecting the typing behavior of the at least one user. The embodiments include categorizing each of the plurality of factors into at least one category comprising temporal information, spatial information, language information, touch information, and so on. Each of the extracted plurality of features is defined with at least one category. Examples of the extracted features include finger tremor, typing posture, character representations, average threshold time gap for correct or wrong touch position, user movement, word semantics, user typing pattern, key logs, habituated typos specific to the at least one user, and so on.

At step 804, the method includes fusing the plurality of features to obtain a plurality of feature vectors. The embodiments include fusing the plurality of features by normalizing/encoding the plurality of features. The normalization is performed using factors, which are exclusive to the respective plurality of features. The features that are not numeric in nature can be encoded to feature vectors. The feature vectors can be processed and optimized by the unified neural network 301c. The embodiments include providing the plurality of feature vectors to the unified neural network 301c.

At step 805, the method includes predicting keystrokes based on the plurality of feature vectors. The unified neural network 301c includes at least one CNN, at least one forward LSTM, at least one backward LSTM, at least one batch normalizer, and an activation layer. The unified neural network 301c can identify and correct neighboring errors and correct contextual errors relevant to language, based on the respective weights of the at least one CNN, at least one forward LSTM, at least one backward LSTM.

The values of the weights may be set during the deployment of the unified neural network 301c in the device 300. Once the unified neural network 301c has been deployed in the device 300, the aggregated data received from the device 300, and the previously obtained aggregated data stored in the repository of the remote device, are used for extracting features that are affecting the typing behavior of users. The features can be determined as known/unknown. The unknown features can be learned, and based on the known/ unknown features the values of the weights of the at least one CNN, at least one forward LSTM and the at least one backward LSTM can be updated to identify and correct neighboring errors, and correct contextual errors relevant to language with a greater precision.

The at least one CNN can capture hidden representations and local features of characters, based on factors such as contextual information pertaining to the at least one user and the device 300, keystrokes, keyboard specifics, and typing pattern of the at least one user. The at least one forward LSTM and the at least one backward LSTM can find long range dependencies and the factors affecting the typing behavior, by identifying the context of a typed word or a typed sentence. The at least one forward LSTM and the at least one backward LSTM can predict characters and words based on previously typed characters/words and perform auto correction.

The activation layer can compute the probabilities of the at least one user pressing a plurality of keys, of which the at least one user had actually intended to press one of the keys, from amongst the plurality of keys. The key that is having the highest probability, amongst the probabilities of the at least one user pressing other keys, can be considered as the predicted keystroke. The embodiments include displaying the key having the highest probability.

The various actions in the flowchart 800 may be performed in the order presented, in a different order, or simultaneously. Further, in some embodiments, some actions listed in FIG. 8 may be omitted.

Figure 9:
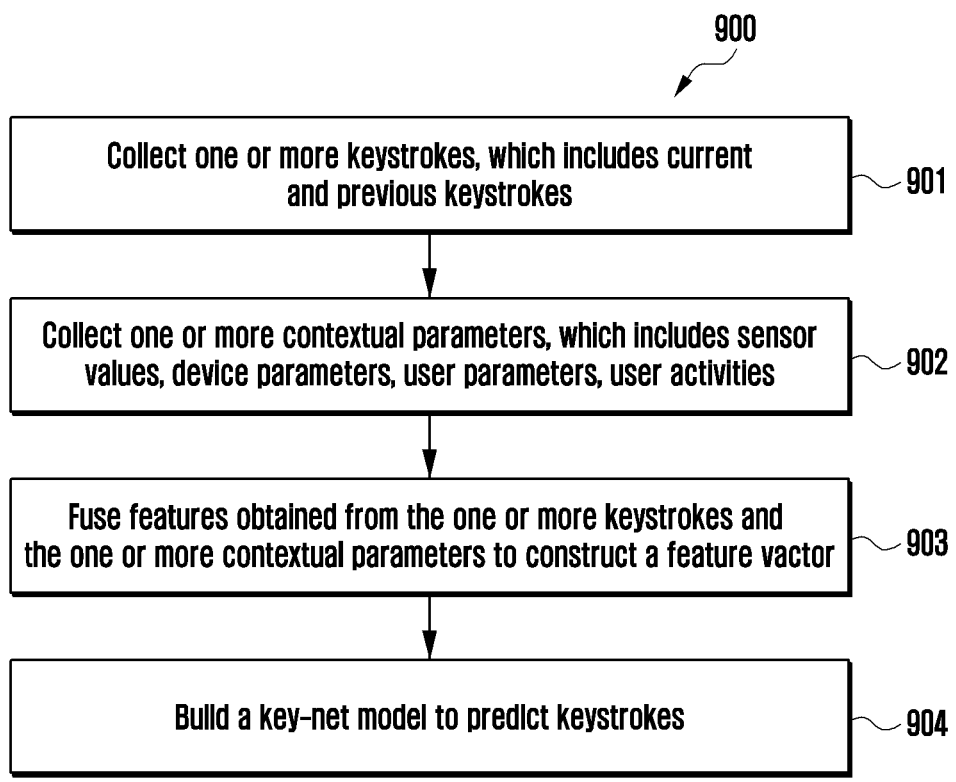
FIG. 9 is a flowchart illustrating a method for building the key-net model on the device, according to an embodiment.

FIG. 9 is a flowchart illustrating a method for building the key-net model on the device 300, according to an embodiment. At step 901, the method includes collecting one or more keystrokes. The key-net model can collect the currently received keystrokes and previous keystrokes. The key-net model can be trained offline using the keystroke logs. At step 902, the method includes collecting contextual parameters such as sensor values, device parameters, user parameters, user activities, and so on. The contextual parameters can have a cumulative impact on the typing behavior. The embodiments include aggregating the collected keystrokes and the contextual parameters and affecting the typing behavior of at least one user.

At step 903, the method includes fusing features obtained from the one or more keystrokes and the one or more contextual parameters to construct a feature vector. The embodiments include extracting a plurality of features from the aggregated contextual parameters and the one or more keystrokes. The embodiments include exploring the aggregated information by analyzing factors that are affecting the typing behavior of the at least one user. The embodiments include categorizing the contextual parameters into multiple categories. Each of the extracted plurality of features is defined with at least one category.

The embodiments include fusing the plurality of features to obtain a plurality of feature vectors. The embodiments include fusing the plurality of features by normalizing/encoding the plurality of features. The normalization is performed using factors, which are exclusive to each of the plurality of features. The features that are not numeric in nature can be encoded to feature vectors. The feature vectors can be processed and optimized by the neural network. The embodiments include providing the plurality of feature vectors to the neural network.

At step 904, the method includes building the key-net model to predict keystrokes. The embodiments include predicting keystrokes, which have been currently typed by the at least one user, based on the feature vectors. Building the key-net model corresponds to training the key-net model using the extracted features. The embodiments include boosting the adaptability of the unified neural network for personalizing keystroke predictions. The key-net model can be trained to determine whether the extracted features are known or unknown. The neural network can identify and correct neighboring errors, and correct contextual errors relevant to language based on the feature vectors. Based on the errors, the weights of the key-net model can be updated.

The key-net model can determine whether the features are known or unknown, based on the values of the feature vectors. If the features are found to be known, then the key-net model predicts the typed key based on previous keystroke predictions. If the features are found to be unknown, then the key-net model can learn the unknown features.

The various actions in the flowchart 900 may be performed in the order presented, in a different order, or simultaneously. Further, in some embodiments, some actions listed in FIG. 9 may be omitted.

Figure 10:
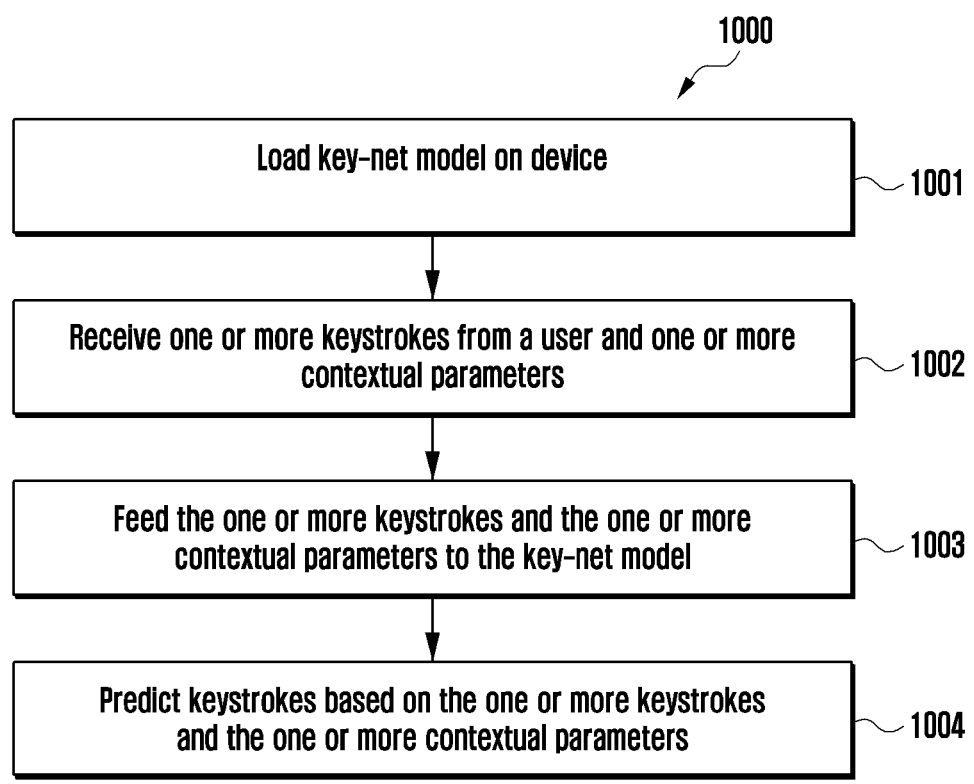
FIG. 10 is a flowchart illustrating a method for predicting keystrokes by the key-net model, according to an embodiment.

FIG. 10 is a flowchart illustrating a method for predicting keystrokes by the key-net model, according to an embodiment. At step 1001, the method includes loading the key-net model on the device 300. The loading can correspond to deployment of the trained key-note model, which can predict keystrokes. At step 1002, the method includes receiving one or more keystrokes from a user and one or more contextual parameters. The key-net model is configured to predict keystrokes based on a cumulative impact of the one or more contextual parameters on typing behavior and typing pattern of the user. The one or more contextual parameters include characteristics of the device 300, parameters pertaining to the device 300 and the user, parameters pertaining to typing posture and typing position of the user, specifics of a virtual keyboard displayed on the device 300, previous keystrokes, typing pattern of the user, and so on.

At step 1003, the method includes providing the one or more keystrokes and the one or more contextual parameters as inputs to the key-net model. A plurality of features, affecting the typing behavior of the user, can be extracted based on the received the one or more keystrokes and the one or more contextual parameters. The feature extraction involves categorizing each of the contextual parameters as temporal information, touch information, spatial information, and language information. The embodiments include fusing the plurality of features to obtain a plurality of feature vectors. In an embodiment, each of the plurality of features can be normalized using factors, exclusive to each of the plurality of features. In an embodiment, the plurality of features can be encoded for fusing the plurality of features. The embodiments include providing the plurality of feature vectors as input to the unified neural network.

At step 1004, the method includes predicting the received keystrokes based on the feature vectors. The plurality of feature vectors can be processed and optimized for discovering features that are affecting the typing behavior. The key-net model can include CNNs, forward LSTMs and backward LSTMs. The key-net model can identify neighboring errors and correct contextual language errors based on the respective weights of the CNNs, forward LSTMs and backward LSTMs.

The weights have been set prior to the deployment of the key-net model in the device 300. Once the key-net model is deployed in the device 300, the one or more keystrokes from a user and one or more contextual parameters can be sent to a remote device for further training of the key-net model. The remote device can detect features from the one or more contextual parameters and determine whether the features as known/unknown. The unknown features can be learned and based on the known/unknown features the weights of the CNNs, forward LSTMs and backward LSTMs can be updated. The device 300 can receive the updated weights and update the key-net model. The updated key-net model can identify and correct neighbor errors, and correct contextual errors relevant to language, with an improved accuracy.

The key-net model can capture hidden representations and local features of characters, find long range dependencies and the factors affecting the typing behavior, to identify the context of a typed word or a typed sentence. The forward LSTMs and the backward LSTMs can predict characters and words based on previously typed characters/words. The key-net model can compute the probabilities of the user pressing a plurality of keys, of which the at least one user had actually intended to press one of the keys, from amongst the plurality of keys. The key that is having the highest probability, amongst the probabilities of the at least one user pressing other keys, is considered as the predicted keystroke.

The various actions in the flowchart 1000 may be performed in the order presented, in a different order, or simultaneously. Further, in some embodiments, some actions listed in FIG. 10 may be omitted.

The embodiments disclosed herein can be implemented through at least one software program running on at least one hardware device and performing network management functions to control the network elements. The network elements shown in FIG. 3 include blocks which can be at least one of a hardware device, or a combination of hardware device and one or more software modules.

The embodiments disclosed herein describe methods and systems for predicting keystrokes based on a cumulative impact of a plurality of features on typing behavior of at least one user. Therefore, the scope of the protection is extended to such a program and in addition to a computer readable means having computer readable codes or programs recorded therein, such computer readable storage means contain program code means for implementation of one or more steps of the method, when the program runs on a server or mobile device or any suitable programmable device executing the program. The method is implemented in a preferred embodiment through or together with a software program written in example Very high speed integrated circuit Hardware Description Language (VHDL) another programming language, or implemented by one or more VHDL or several software modules being executed on at least one hardware device. The hardware device can be any kind of portable device that can be programmed for execution. The device may also include means, which could be, for example, a hardware means, for example, an Application-specific Integrated Circuit (ASIC), or a combination of hardware and software means, for example, an ASIC and a Field Programmable Gate Array (FPGA), or at least one microprocessor and at least one memory with software modules located therein. The method embodiments described herein could be implemented partly in hardware and partly in software. Alternatively, the invention may be implemented on different hardware devices, e.g. using a plurality of Central Processing Units (CPUs).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method of predicting keystrokes, the method comprising:
   obtaining, by a device, aggregated data representing a cumulative impact of a plurality of types of factors affecting a typing behavior of a user, based on receiving a keystroke from the user;
   extracting, by the device, a plurality of features from the aggregated data;
   determining, by the device, a plurality of feature vectors from the plurality of features; and
   predicting, by a unified neural network in the device, a predicted key, based on a probability of the user intending to press the predicted key determined from the plurality of feature vectors,
   wherein the determining of the plurality of feature vectors comprises:
      determining whether an extracted feature from the plurality of features is numerical or non-numerical,
      based on determining that the extracted feature is numerical, normalizing the extracted feature by a factor unique to the extracted feature, and
      based on determining that the extracted feature is non-numerical, encoding the extracted feature.

2. The method of claim 1, wherein the plurality of types of factors affecting the typing behavior of the user comprises at least one of:
   characteristics of the device, the characteristics of the device comprising at least one of type of a display of the device, a bezel size of a bezel of the device, and presence of an edge display of the device;
   contextual parameters pertaining to the device, the contextual parameters pertaining to the device comprising at least one of an orientation of the device, a speed of movement of the device, a tilt angle of the device, and a touch pressure of the user on the device;
   contextual parameters pertaining to the user, the contextual parameters pertaining to the user comprising at least one of number of fingers of the user used for typing, a type of finger of the user used for typing, a size of a finger of the user used for typing, a typing speed of the user, and a movement of the device while typing;
   specifics of a keyboard displayed on the device comprising, the specifics of the keyboard comprising at least one of a key size of keys of the keyboard, a size of a keyboard layout of the keyboard, a key position of the keys of the keyboard, a keypad type of the keyboard, a sub-keypad type of the keyboard, and keystroke details comprising at least one of characters typed previously by the user and words typed previously by the user; and
   touch information comprising at least one of an inter-key timestamp, an intra-key timestamp, and a touch position.

3. The method of claim 1, wherein the plurality of features are extracted by categorizing the aggregated data into at least one category comprising temporal information, spatial information, syntactic information, and touch information.

4. The method of claim 1, further comprising:
   determining probabilities of the user intending to press a plurality of keys, including the predicted key,
   wherein the probability of the user intending to press the predicted key is highest among the probabilities of the user intending to press the plurality of keys.

5. The method of claim 1, further comprising:
   displaying, by the device, the predicted key.

6. The method of claim 1, further comprising:
   predicting, based on at least one of the plurality of feature vectors, at least one of: at least one character, based on at least one of previously typed characters and at least one previously typed word.

7. A method of predicting keystrokes, the method comprising:
   receiving, by a device, a keystroke from a user;
   generating, by the device, a keystroke log, wherein the keystroke is stored in the keystroke log;
   training a unified neural network based on data stored in the keystroke log to enable the unified neural network to identify known features, and to learn unknown features by updating at least one weight corresponding to the unified neural network based on the unknown features; and predicting, by the unified neural network in the device, a predicted keystroke based on the known features and the unknown features, wherein the predicting comprises:
determining whether at least one feature of the known features and the unknown features is numerical or non-numerical,
based on determining that the at least one feature is numerical, normalizing the at least one feature by a factor unique to the at least one feature, and
based on determining that the at least one feature is non-numerical, encoding the least one feature.

8. The method of claim 7, further comprising:
receiving by the device, contextual parameters; and
training the unified neural network based on the contextual parameters to enable the unified neural network to identify the known features and learn the unknown features.

9. The method of claim 8, wherein the contextual parameters comprises at least one of sensor values, device parameters, user parameters, user activities.

10. The method of claim 8, further comprising:
fusing features obtained from the keystroke log and the contextual parameters to construct feature vectors; and
training, the unified neural network based on the feature vectors.

11. The method of claim 10, wherein the unified neural network in the device can determine whether the features are known or unknown based on values of the feature vectors.

12. A device for predicting keystrokes comprising:
a memory storing computer-readable instructions; and
a processor, the processor when executing the computer-readable instructions configured to:
obtain aggregated data representing a cumulative impact of a plurality of types of factors affecting a typing behavior of a user, on receiving a keystroke from the user;
extract a plurality of features from the aggregated data;
determine a plurality of feature vectors from the plurality of features; and
predict, by a unified neural network in the device, a predicted key, based on a probability of the user intending to press the predicted key determined from the plurality of feature vectors,
wherein the determining of the plurality of feature vectors comprises:
determining whether an extracted feature from the plurality of features is numerical or non-numerical,
based on determining that the extracted feature is numerical, normalizing the extracted feature by a factor unique to the extracted feature, and
based on determining that the extracted feature is non-numerical, encoding the extracted feature.

13. The device of claim 12, wherein the plurality of types of factors affecting the typing behavior of the user comprises at least one of:
characteristics of the device, the characteristics of the device comprising at least one of a type of display of the device, a bezel size of a bezel of the device, and presence of an edge display of the device;
contextual parameters pertaining to the device, the contextual parameters pertaining to the device comprising at least one of an orientation of the device, a speed of movement of the device, a device tilt angle of the device, and a touch pressure of the user on the device;
contextual parameters pertaining to the user, the contextual parameters pertaining to the user comprising at least one of number of fingers of the user used for typing, type of finger of the user used for typing, a size of a finger of the user used for typing, a typing speed of the user, and movement of the device while typing;
specifics of a keyboard displayed on the device, the specifics of the keyboard comprising at least one of a key size of keys of the keyboard, a size of a keyboard layout of the keyboard, a key position of the keys of the keyboard, a keypad type of the keyboard, a sub-keypad type of the keyboard, and keystroke details comprising at least one of characters typed previously by the user and words typed previously by the user; and
touch information comprising at least one of an inter-key timestamp, an intra-key timestamp, and a touch position.

14. The device of claim 12, wherein the plurality of features are extracted by categorizing the aggregated data into at least one category comprising temporal information, spatial information, syntactic information, syntactic information and touch information.

15. The device of claim 12, wherein the processor, when executing the computer-readable instructions, is further configured to determine probabilities of the user intending to press a plurality of keys, including the predicted key, and
wherein the probability of the user intending to press the predicted key is highest among the probabilities of the user intending to press the plurality of keys.

16. The device of claim 12, further comprising a display, wherein the processor, when executing the computer-readable instructions, is further configured to display the predicted key on the display.

17. The device of claim 12, wherein the processor, when executing the computer-readable instructions, is further configured to predict, based on at least one of the plurality of feature vectors, at least one of: at least one character, based on at least one of previously typed characters and at least one previously typed word.

* * * * *